United States Patent
Manickam et al.

(10) Patent No.: US 12,537,770 B2
(45) Date of Patent: Jan. 27, 2026

(54) SYSTEMS AND METHODS FOR DYNAMICALLY SELECTING A LOAD BALANCING ALGORITHM

(71) Applicant: Cisco Technology, Inc., San Jose, CA (US)

(72) Inventors: Arul Murugan Manickam, San Jose, CA (US); Avinash Shah, Pleasanton, CA (US); Laxmikantha Reddy Ponnuru, San Ramon, CA (US); Satyajit Das, Lake Tapps, WA (US); Deepa Rajendra Sangolli, San Jose, CA (US); Govindakrishnan Kannan, Santa Clara, CA (US); Pritam Baruah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 17/816,818

(22) Filed: Aug. 2, 2022

(65) Prior Publication Data

US 2023/0344771 A1   Oct. 26, 2023

Related U.S. Application Data

(60) Provisional application No. 63/332,840, filed on Apr. 20, 2022.

(51) Int. Cl.
*H04L 47/125* (2022.01)
*H04L 47/2416* (2022.01)

(52) U.S. Cl.
CPC ........ *H04L 47/125* (2013.01); *H04L 47/2416* (2013.01)

(58) Field of Classification Search
CPC .......................... H04L 47/125; H04L 47/2416
USPC ......................................................... 709/224
See application file for complete search history.

(56) References Cited

U.S. PATENT DOCUMENTS

| | | | |
|---|---|---|---|
| 9,270,521 B2* | 2/2016 | Tompkins | ............... H04L 41/00 |
| 10,505,849 B1* | 12/2019 | Iny | ......................... H04L 47/283 |
| 2011/0153831 A1* | 6/2011 | Mutnuru | ............. H04L 61/4511 |
| | | | 709/226 |

(Continued)

FOREIGN PATENT DOCUMENTS

| CN | 107864189 A | 3/2018 |
|---|---|---|
| CN | 107948088 A | 10/2021 |

(Continued)

OTHER PUBLICATIONS

International Search Report and Written Opinion for International Application No. PCT/US2023/018013, mailed Aug. 3, 2023, 13 Pages.

*Primary Examiner* — Karen C Tang
(74) *Attorney, Agent, or Firm* — Baker Botts L.L.P.

(57) ABSTRACT

In one embodiment, a method includes receiving traffic and identifying one or more attributes associated with the traffic. The method also includes dynamically selecting a load balancing algorithm based on the one or more attributes in accordance with a load balancing scheme. The method further includes performing load balancing on the traffic in accordance with the load balancing algorithm and communicating the traffic from a first network element to a second network element in accordance with the load balancing.

20 Claims, 5 Drawing Sheets

(56) References Cited

U.S. PATENT DOCUMENTS

| | | | | |
|---|---|---|---|---|
| 2012/0163180 | A1* | 6/2012 | Goel | H04L 45/306 |
| | | | | 370/238 |
| 2015/0358236 | A1* | 12/2015 | Roach | H04L 47/22 |
| | | | | 370/235 |
| 2016/0080505 | A1* | 3/2016 | Sahin | H04L 67/1027 |
| | | | | 709/229 |
| 2016/0094401 | A1* | 3/2016 | Anwar | G06F 11/3006 |
| | | | | 709/223 |
| 2017/0126790 | A1 | 5/2017 | Mortsolf et al. | |
| 2017/0163537 | A1* | 6/2017 | Peterson | H04L 67/1025 |
| 2017/0214737 | A1* | 7/2017 | Agarwal | G06F 9/505 |
| 2019/0108405 | A1* | 4/2019 | Xu | G06V 20/52 |
| 2020/0153739 | A1* | 5/2020 | Gafni | H04L 47/41 |
| 2020/0304564 | A1* | 9/2020 | Yin | H04L 67/1027 |
| 2022/0353201 | A1* | 11/2022 | Navali | H04L 41/5054 |
| 2022/0398038 | A1* | 12/2022 | Anchi | G06F 3/0611 |
| 2023/0120010 | A1* | 4/2023 | Patel | G06F 12/0802 |
| | | | | 711/118 |

FOREIGN PATENT DOCUMENTS

| | | | |
|---|---|---|---|
| CN | 113553184 | A | 10/2021 |
| EP | 3399703 | A1 | 11/2018 |

* cited by examiner

SYSTEMS AND METHODS FOR DYNAMICALLY SELECTING A LOAD BALANCING ALGORITHM

CROSS-REFERENCE TO RELATED APPLICATIONS

This application claims benefit of U.S. Provisional Patent Application No. 63/332,840 filed Apr. 20, 2022 by Arul Murugan Manickam et al. and entitled "DYNAMIC LOAD BALANCING ALGORITHM SELECTION BASED ON APPLICATION OR POLICY," which is incorporated herein by reference as if reproduced in its entirety.

TECHNICAL FIELD

The present disclosure relates generally to communication networks, and more specifically to systems and methods for dynamically selecting a load balancing algorithm.

BACKGROUND

In a typical router, load balancing is automatically activated if the routing table has multiple paths to a destination. A typical enterprise edge router may provide one or more different types of load balancing algorithms. Currently, for a global or per-virtual private network (VPN) configuration, a user may specify a single load balancing algorithm, which is applied to all different applications even though different applications may require different load balancing algorithms for efficiency and correctness.

DESCRIPTION OF EXAMPLE EMBODIMENTS

Overview

Figure 1:
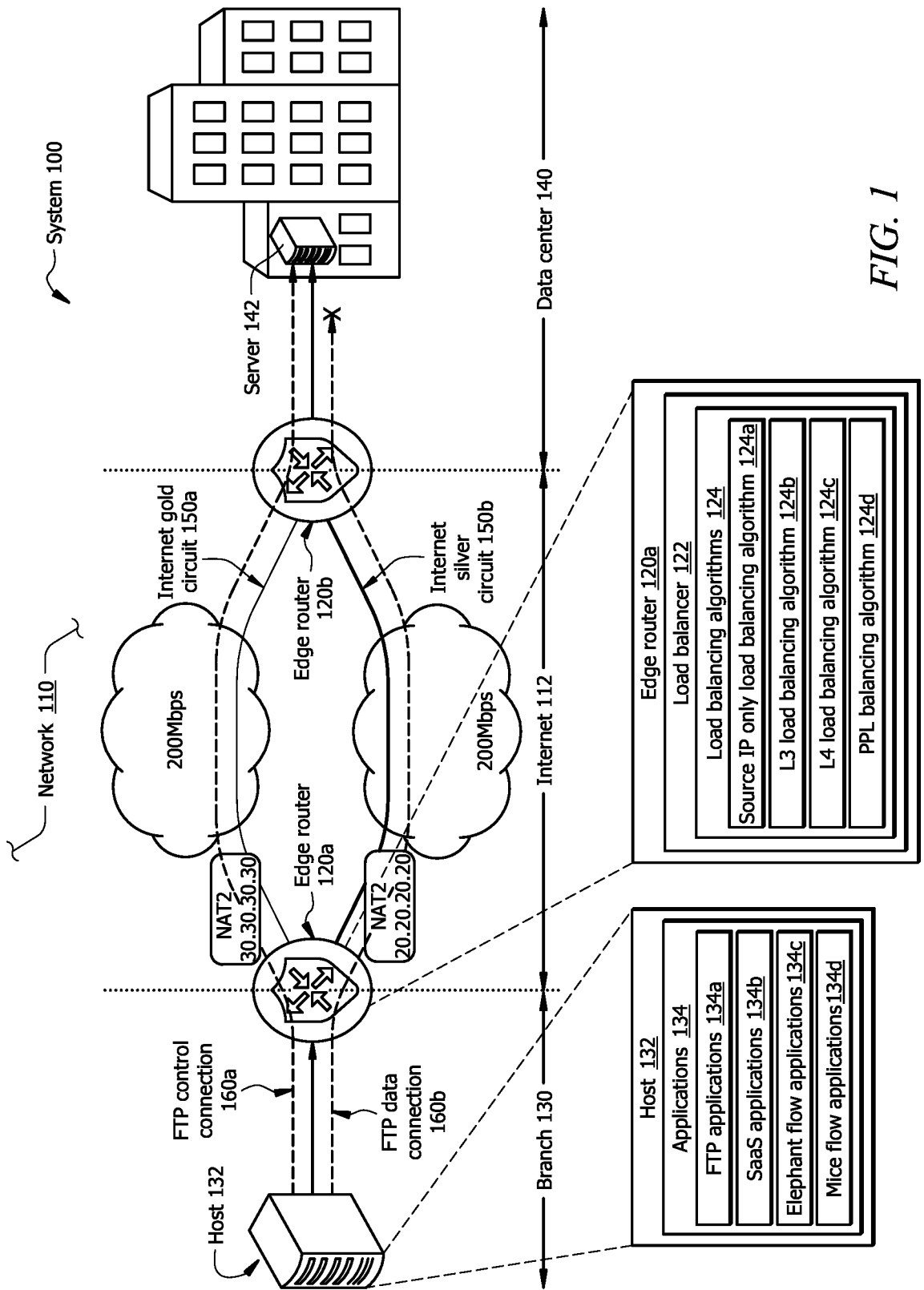
FIG. 1 illustrates a load balancing system, in accordance with certain embodiments.

According to an embodiment, a first network element includes one or more processors and one or more computer-readable non-transitory storage media coupled to the one or more processors and including instructions that, when executed by the one or more processors, cause the first network element to perform operations. The operations include receiving traffic and identifying one or more attributes associated with the traffic. The operations also include dynamically selecting a load balancing algorithm based on the one or more attributes in accordance with a load balancing scheme. The operations further include performing load balancing on the traffic in accordance with the load balancing algorithm and communicating the traffic to a second network element in accordance with the load balancing.

In certain embodiments, the operations include dynamically selecting the load balancing algorithm from at least one of the following load balancing algorithms: a source IP address only load balancing algorithm, an L3 load balancing algorithm, an L4 load balancing algorithm, or a per-packet load (PPL) balancing algorithm.

In some embodiments, the one or more attributes associated with the traffic include a type of an application. The type of the application may be at least one of the following: a File Transfer Protocol (FTP) application, a software as a service (SaaS) application, an elephant flow application, or a mouse flow application. In certain embodiments, the load balancing scheme is an application-based load balancing scheme that matches the type of the application to the load balancing algorithm.

In some embodiments, the load balancing scheme is a user-defined application-to-algorithm map load balancing scheme that matches the type of application to the user-defined load balancing algorithm.

In certain embodiments, the load balancing scheme is a policy-based load balancing scheme that uses the one or more attributes and a policy to select the load balancing algorithm. In some embodiments, the one or more attributes include at least one from the following set of attributes: a type of an application, a source Internet Protocol (IP) address, a destination IP address, a subnet, an IP Differentiated Services Code Point (DSCP), or a type of protocol.

According to another embodiment, a method includes receiving traffic and identifying one or more attributes associated with the traffic. The method also includes dynamically selecting a load balancing algorithm based on the one or more attributes in accordance with a load balancing scheme. The method further includes performing load balancing on the traffic in accordance with the load balancing algorithm and communicating the traffic from a first network element to a second network element in accordance with the load balancing.

According to yet another embodiment, one or more computer-readable non-transitory storage media embody instructions that, when executed by a processor, cause the processor to perform operations. The operations include receiving traffic and identifying one or more attributes associated with the traffic. The operations also include dynamically selecting a load balancing algorithm based on the one or more attributes in accordance with a load balancing scheme. The operations further include performing load balancing on the traffic in accordance with the load balancing algorithm and communicating the traffic from a first network element to a second network element in accordance with the load balancing.

Technical advantages of certain embodiments of this disclosure may include one or more of the following. Certain embodiments of this disclosure include a network element (e.g., an edge router) that dynamically selects a load-balancing scheme based on application/policy requirements without any user intervention. Certain embodiments of this disclosure provide dynamic load-balancing algorithm selection based on application or policy, which overrides the user configured default load-balancing algorithm. This approach may satisfy the requirement of recent cloud networking and SaaS applications and improve network paths, bandwidth, and overall efficiency. Embodiments of this disclosure are applicable to any applications that require special hashing.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for dynamically selecting a load balancing algorithm. A typical enterprise edge router may provide one or more of the following different types of load balancing algorithms: (1) a source IP address only load balancing algorithm, (2) an L3 load balancing algorithm; (3) an L4 load balancing algorithm; and (4) a PPL balancing algorithm. Currently, for a global or per-VPN configuration, a user may specify a single load balancing algorithm, which is applied to all different applications. This may not be efficient since different types of applications require different load balancing for efficiency and correctness.

FIG. 1 illustrates a load balancing system 100, in accordance with certain embodiments. System 100 or portions thereof may be associated with an entity, which may include any entity, such as a business, company, or enterprise, that performs load balancing. In certain embodiments, the entity may be a service provider that performs load balancing. The components of system 100 may include any suitable combination of hardware, firmware, and software. For example, the components of system 100 may use one or more elements of the computer system of FIG. 5.

In the illustrated embodiment of FIG. 1, system 100 includes a network 110, an internet 112, edge routers 120 (edge router 120a and edge router 120b), a load balancer 122, load balancing algorithms 124 (a source IP only load balancing algorithm 124a, an L3 load balancing algorithm 124b, an L4 load balancing algorithm 124c, and a PPL balancing algorithm 124d), a branch 130, a host 132, applications 134 (FTP applications 134a, SaaS applications 134b, elephant flow applications 134c, and mice flow applications 134d), a data center 140, a server 142, internet circuits 150 (an internet gold circuit 150a and an internet silver circuit 150b), and File Transfer Protocol (FTP) connections 160 (an FTP control connection 160a and an FTP data connection 160b).

Network 110 of system 100 is any type of network that facilitates communication between components of system 100. Network 110 may connect one or more components of system 100. One or more portions of network 110 may include an ad-hoc network, an Internet, an intranet, an extranet, a VPN, an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. In the illustrated embodiment of FIG. 1, network 110 includes Internet 112. Internet 112 is a global system of interconnected computer networks that uses the Internet protocol suite (Transmission Control Protocol (TCP)/IP) to communicate between network components.

Network 110 may be any communications network, such as a private network, a public network, a connection through Internet 112, a mobile network, a WI-FI network, etc. Network 110 may include a core network, an access network of a service provider, an Internet service provider (ISP) network, and the like. An access network is the part of the network that provides a user access to a service. A core network is the part of network 110 that acts like a backbone to connect the different parts of the access network(s). One or more components of system 100 may communicate over network 110. In the illustrated embodiment of FIG. 1, network 110 is a software-defined wide area network (SD-WAN).

Network 110 of system 100 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. In the illustrated embodiment of FIG. 1, nodes of network 110 include edge routers 120, host 132, and server 142.

Edge routers 120 (edge router 120a and edge router 120b) are specialized routers that reside at an edge of network 110. In certain embodiments, edge routers 120 use static and/or dynamic routing to send data to and/or receive data from one or more networks 110 of system 100. Edge routers 120 may include one or more hardware devices, one or more servers that include routing software, and the like. In certain embodiments, edge router 120a of system 100 is a branch edge router that sends data to and/or receives data from host 132 of branch 130. In the illustrated embodiment of FIG. 1, edge router 120a communicates data to and/or receives data from edge router 120b via Internet 112, and edge router 120b communicates data to and/or receives data from data center 140.

In certain embodiments, edge router 120a receives one or more packets from host 132. Each packet's header may include the proper protocols, the originating address (the IP address of host 132), the destination address (the IP address of server 142) and the packet number (e.g., packet number 1, 2, 3, 4, etc.). In some embodiments, edge router 120a identifies the destination address in the header and compares it to a lookup table to determine where to send the packet.

In certain embodiments, edge router 120a includes a load balancer 122. Load balancer 122 is hardware and/or software that distributes traffic across multiple nodes of network 110. In some embodiments, load balancer 122 identifies specific criteria (e.g., source IP addresses, destination IP addresses, source ports, destination ports, protocols, etc.) associated with incoming packets. When a packet arrives, load balancer 122 may match the criteria to an entry in the table. In certain embodiments, load balancer 122 relies on hash function that is computed over each incoming packet. For example, load balancer 122 may use a generalized hash function (e.g., a cryptographic hash function) to generate a digest of the source address, destination addresses, source port, and/or destination port. As another example, load balancer 122 may use a cyclic redundancy check (CRC) over the source address, destination addresses, source port, and/or destination port.

In certain embodiments, load balancer 122 of edge router 120a uses one or more load balancing algorithms 124 to distribute traffic through Internet 112. Load balancing algorithms 124 are the rules that load balancer 122 uses to distribute the traffic through Internet 112. Load balancing algorithms 124 include the following: source IP only load balancing algorithm 124a, L3 load balancing algorithm 124b, L4 load balancing algorithm 124c, and PPL balancing algorithm 124d.

Source IP only load balancing algorithm 124a makes routing decisions based on the source IP address only. For example, load balancer 122 of edge router 120a may be configured to make load-balancing decisions based solely on the source IP address of the incoming traffic. Using the source IP only limits the criteria used in hashing, which makes it more likely that a particular circuit will be selected to forward the traffic.

L3 load balancing algorithm 124b makes routing decisions based on source and destination IP addresses only. In certain embodiments, L3 load balancing algorithm 124b uses multiple paths to achieve load sharing across multiple source-destination host pairs. Packets for a given source-destination host pair may be guaranteed to take the same path, even if multiple paths are available.

L4 load balancing algorithm 124c makes routing decisions based on the source IP address, the destination IP address, the source port, and the destination port associated with the traffic. In certain embodiments, L4 load balancing algorithm 124c benefits traffic streams running over equal cost paths that are not load shared because the majority of the traffic is between peer addresses that use different port numbers, such as Real-Time Protocol (RTP) streams.

PPL balancing algorithm 124d communicates successive data packets over different paths without regard to individual hosts or user sessions. For example, PPL balancing algorithm 124d may communicate a first packet to a destination (e.g., server 142 of data center 140) over a first path, a second packet to the same destination over the second path, and so on. In certain embodiments, PPL balancing algorithm 124d guarantees equal load across all links. However, there is potential that the packets may arrive out of order at the destination because differential delay may exist within network 110. PPL balancing algorithm 124d may use a round-robin method to determine which path each packet takes to the destination.

Branch 130 of system 100 is a part of an enterprise network infrastructure that provides users at a geographically disperse remote site access to the same network services as users in the enterprise campus. Branch 130 may include one or more buildings, offices, stores, homes, and the like. In certain embodiments, branch 130 and data center 140 are established and maintained by the same business enterprise. In the illustrated embodiment of FIG. 1, branch 130 includes host 132.

Host 132 of branch 130 is a device (e.g., a server or a client) that is connected to network 110. In certain embodiments, host 132 provides resources, data services, and/or programs to clients. Host 132 may be associated with a unique IP address, a hostname, etc. The IP address of host 132 may serve as the physical address of host 132 in network 110. In certain embodiments, the IP address is a 32-bit number. The hostname is a label assigned to host 132. Host 132 may provide the processing, memory, local storage, and/or network connectivity that drive applications. In the illustrated embodiment of FIG. 1, host 132 is associated with applications 134.

Applications 134 are computer programs designed to carry out specific tasks. Applications may include word processing software, spreadsheet software, presentation software, web browsers, multimedia software, graphics software, educational software, business application software, productivity software, and the like. In certain embodiments, applications 134 are classified by type (e.g., SaaS applications), by protocol (e.g., FTP traffic), by flow size (e.g., an elephant flow or a mouse flow), and the like. In some embodiments, applications 134 may be associated with an application list. For example, an SaaS application list may include WebEx audio applications, WebEx video applications, and the like. In the illustrated embodiment of FIG. 1, applications 134 include FTP applications 134a, SaaS applications 134b, elephant flow applications 134c, and mice flow applications 134d.

FTP applications 134a are applications that use FTP software. FTP software uses a client server model, which requires an FTP client (e.g., host 132) and an FTP server (e.g., server 142). FTP applications 134a may be used to upload and/or download files for archival, to share files too large for email, to securely share files inter-office and/or externally, to transfer data back to disaster recovery sites, and the like.

SaaS applications 134b are applications that are managed by a SaaS provider. SaaS is a delivery and licensing model in which software is accessed on the web via a subscription rather than installed on local computers. Typically, entities do not manage SaaS applications 134b or invest in hardware to run SaaS applications 134b. Instead, a provider hosts and manages the infrastructure to support SaaS applications 134b. In certain embodiments, SaaS are cloud-based applications accessed over the Internet. SaaS applications 134b may include email tools, calendaring tools, office tools (e.g., Microsoft Office 365), meeting tools (Webex), etc.

Elephant flow applications 134c are applications that are associated with elephant flows. An elephant flow is a single session, relatively long running network connection (e.g., a TCP connection) that consumes a large (in total bytes) or disproportionate amount of bandwidth. Elephant flows may be associated with virtual machine (VM) migration, a backup data transfer, a video, data files, etc.

Mice flow applications 134d are applications that are associated with mice flows. A mouse flow is a short (in total bytes) flow set up by a protocol (e.g., TCP) flow measured over a network link. In certain embodiments, a mouse flow has fewer than "n" number of packets and an elephant flow has at least "n" number of packets, where the constant "n" is a degree of freedom in the analysis. Mice flows may include queries, responses, control messages, and the like that are exchanged between application hosts. In TCP applications, mice flows do not tolerate packet drops well. Because of the small number of packets in mice flows, most mice flows complete in the TCP slow-start phase, with a small TCP window size. If there are not enough packets in transit to trigger TCP fast retransmission for a lost packet, edge router 120a may not be able to detect the packet loss until the TCP retransmission timer expires. Retransmission timeout can be detrimental to mice-flow performance and can severely degrade overall application performance. Therefore, it is imperative to avoid packet losses in mice flows.

Different applications 134 are better suited for different load balancing algorithms 124. For example, mice flow applications 134d may be best suited for L3 load balancing algorithm 124b to reduce and/or avoid packet loss. As another example, FTP applications 134a may be suited for source IP only load balancing algorithm 124a to avoid packet drop at server 142. As still another example, SaaS applications 134b open multiple sub-flows. If multiple internet circuits are involved, each of the sub-flows may receive a different public IP address. This may cause the flow to be rejected by the SaaS application. In this case, source IP address only load balancing algorithm 124a may be required to avoid packet drop at server 142. As yet another example, elephant flow applications 134c may be best suited for PPL balancing algorithm 124d to efficiently utilize bandwidth by distributing packets among multiple available circuits and avoid pinning the elephant flow to one circuit. As still another example, multi-path Transmission Control Protocol (MPTCP) opens multiple connections for end-to-end efficient bandwidth utilization. The MPTCP application may be best suited for L4 load balancing algorithm 124c.

Data center 140 of system 100 is a physical facility that organizations use to house their critical applications and data. Data center 140 may include routers, switches, firewalls, storage systems, servers, application-delivery controllers, and the like. These components of data center 140 may store and/or manage business-critical data, applications, and the like. Data center 140 may be an enterprise data center, a managed services data center, a colocation data center, a cloud data center, a combination thereof, or any other suitable type of data center.

Server 142 of data center 140 is a computer or other device that provides resources, data services, and/or programs to data center 140. Server 142 may provide the processing, memory, local storage, and network connectivity that drive applications. Server 142 may be a physical server or a virtualized server. In the illustrated embodiment of FIG. 1, server 142 communicates traffic to and/or receives traffic from internet circuits 150 of Internet 112.

Internet circuits 150 (internet gold circuit 150a and internet silver circuit 150b) of system 100 are the available paths between edge router 120a to edge router 120b. In certain embodiments, Internet circuits 150 are connections that carry Internet services to sites (e.g., branch 130 and data center 140). Internet circuits 150 may include leased lines, MPLS, IP Security (IPsec), VPN tunnels, fiber, T1 connections (e.g., bonded T1 connections), Digital Subscriber Line (DSL) (e.g., asymmetrical DSL, symmetrical DSL, high data rate DSL, very high data rate DSL, etc.), cable modems, dedicated internet access (DIA) circuits, ethernet circuits, LAN circuits, and the like. Internet circuits 150 may include point-to-point circuits, point-to-multipoint circuits, and/or multipoint-to-multipoint circuits.

In the illustrated embodiment of FIG. 1, Internet gold circuit 150a is associated with an internet speed of 200 megabits per second (Mbps), and Internet silver circuit 150b is associated with a relatively slower internet speed of 100 Mbps. Mbps are units of measurement for network bandwidth and throughput.

FTP connections 160 (FTP control connection 160a and FTP data connection 160b) of system 100 are connections used by FTP to transfer data between a client (e.g., host 132 of branch 130) and a server (e.g., server 142 of data center 140) of network 110. FTP is an application protocol in the IP suite. FTP supports file transfers among unlike hosts in diverse internetworking environments. Using FTP, files can be moved from one computer to another, even if each computer runs a different operating system and uses a different file storage format.

FTP control connection 160a is the main FTP connection that is used to communicate commands between host 132 of branch 130 and server 142 of data center 140. In certain embodiments, host 132 of branch 130 and server 142 of data center 140 use FTP control connection 160a to create FTP data connection 160b. FTP data connection 160b is used by host 132 of branch 130 and server 142 of data center 140 to transfer data.

In the illustrated embodiment of FIG. 1, host 132 in branch 130 performs FTP to server 142 in data center 140 and forwards FTP traffic to edge router 120a. Edge router 120a performs network address translation (NAT), which is enabled on Internet gold circuit 150a and Internet silver circuit 150b. FTP control connection 160a is the main flow sourced from IP address 30.30.30.30, and FTP data connection 160b is the sub-flow sourced from IP address 20.20.20.20. Since the main-flow tuple and the sub-flow tuple load-balance hash algorithms are different, FTP control connection 160a may egress on the interface of Internet gold circuit 150a, and FTP data connection 160b may egress on the interface of Internet silver circuit 150b due to the different load balancing algorithms. These different sources may cause packet drops at server 142 of data center 140 since server 142 is expecting the sub-flow from source IP address 30.30.30.30. SaaS applications 134b, which have multiple flows (main and sub-flows), also face the same issues. The dynamic load balancing schemes discussed in FIG. 3 below address these issues by dynamically selecting source IP only load balancing algorithm 124a since it is best suited for FTP applications 134a and SaaS applications 134b.

Although FIG. 1 illustrates a particular number of networks 110, edge routers 120 (edge router 120a and edge router 120b), load balancers 122, load balancing algorithms 124 (source IP only load balancing algorithm 124a, L3 load balancing algorithm 124b, L4 load balancing algorithm 124c, and PPL balancing algorithm 124d), branches 130, hosts 132, applications 134 (FTP applications 134a, SaaS applications 134b, elephant flow applications 134c, and mice flow applications 134d), data centers 140, servers 142, Internet circuits 150 (Internet gold circuit 150a and Internet silver circuit 150b), and FTP connections 160 (FTP control connection 160a and FTP data connection 160b), this disclosure contemplates any suitable number of networks 110, edge routers 120, load balancers 122, load balancing algorithms 124, branches 130, hosts 132, applications 134, data centers 140, servers 142, Internet circuits 150, and FTP connections 160. For example, system 100 may include more or less than four load balancing algorithms 124. As another example, system 100 may include more or less than four types of applications 134. As still another example, system 100 may include more than two Internet circuits 150.

Although FIG. 1 illustrates a particular arrangement of network 110, edge routers 120 (edge router 120a and edge router 120b), load balancer 122, load balancing algorithms 124 (source IP only load balancing algorithm 124a, L3 load balancing algorithm 124b, L4 load balancing algorithm 124c, and PPL balancing algorithm 124d), branch 130, host 132, applications 134 (FTP applications 134a, SaaS applications 134b, elephant flow applications 134c, and mice flow applications 134d), data center 140, server 142, Internet circuits 150 (Internet gold circuit 150a and Internet silver circuit 150b), and FTP connections 160 (FTP control connection 160a and FTP data connection 160b), this disclosure contemplates any suitable arrangement of network 110, edge routers 120, load balancer 122, load balancing algorithms 124, branch 130, host 132, applications 134, data center 140, server 142, Internet circuits 150, and FTP connections 160. For example, branch 130 and/or data center 140 may be replaced with a different type of site location.

Furthermore, although FIG. 1 describes and illustrates particular components, devices, or systems carrying out particular actions, this disclosure contemplates any suitable combination of any suitable components, devices, or systems carrying out any suitable actions.

Figure 2:
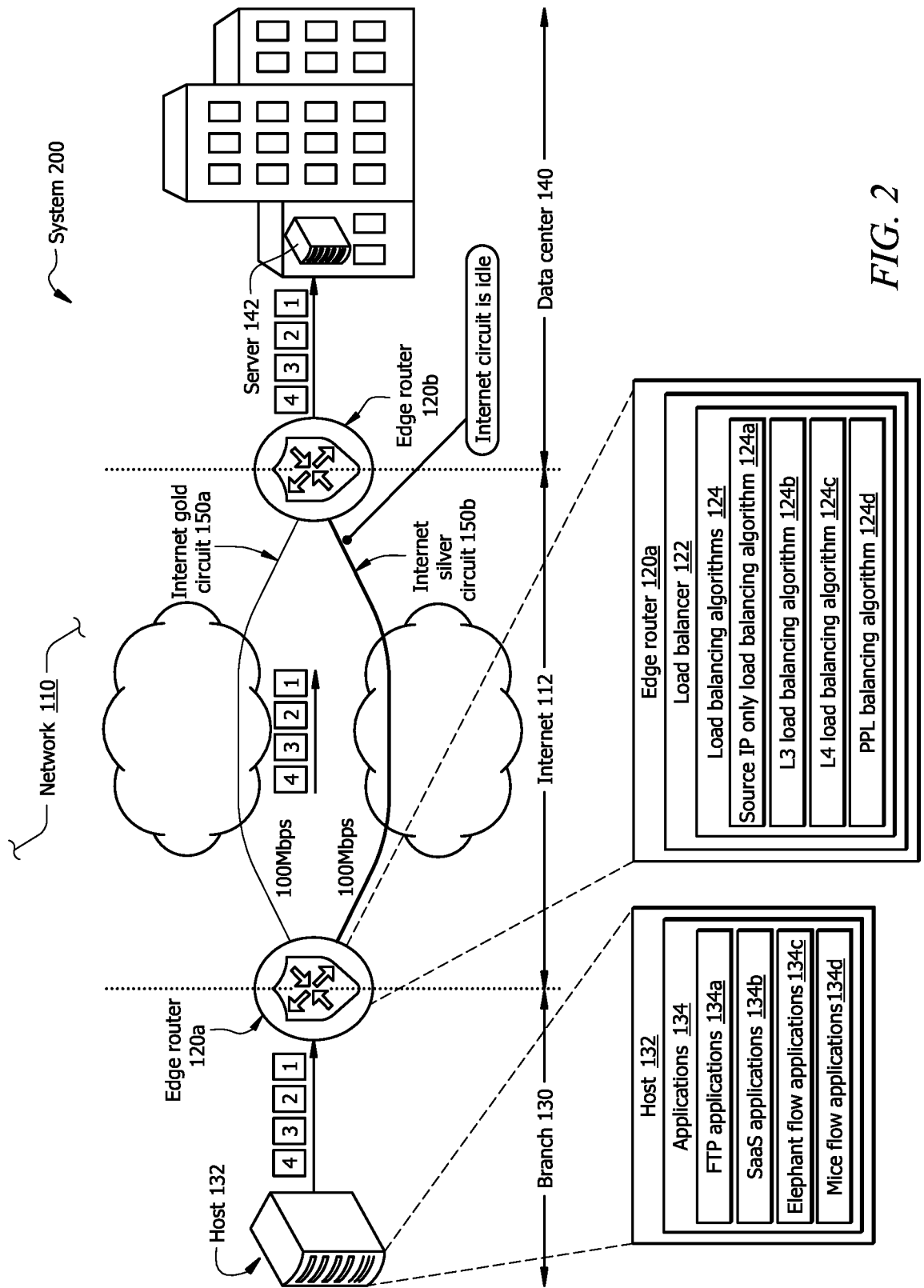
FIG. 2 illustrates another load balancing system, in accordance with certain embodiments.

FIG. 2 illustrates an example load balancing system 200, in accordance with certain embodiments. System 200 or portions thereof may be associated with an entity, which may include any entity, such as a business, company, or enterprise, that performs load balancing. In certain embodiments, the entity may be a service provider that performs load balancing. The components of system 200 may include any suitable combination of hardware, firmware, and software. For example, the components of system 200 may use one or more elements of the computer system of FIG. 5.

In the illustrated embodiment of FIG. 2, system 200 includes network 110, edge routers 120 (edge router 120a and edge router 120b), load balancer 122, load balancing algorithms 124 (source IP only load balancing algorithm 124a, L3 load balancing algorithm 124b, L4 load balancing algorithm 124c, and PPL balancing algorithm 124d), branch 130, host 132, applications 134 (FTP applications 134a, SaaS applications 134b, elephant flow applications 134c, and mice flow applications 134d), data center 140, server 142, and Internet circuits 150 (Internet gold circuit 150a and Internet silver circuit 150b), which are described above in FIG. 1.

In the illustrated embodiment of FIG. 2, elephant flow application 134c at host 132 of branch 130 attempts to synchronize the data to server 142 of data center 140. Due to the existing configured hash selection (e.g., L3 load balancing algorithm 124b), the elephant flow packets (e.g., packets 1 through 4) may follow either internet gold circuit 150a or internet silver circuit 150b, even though PPL balancing algorithm 124d is most suitable for elephant flow applications 134c. PPL balancing algorithm 124d will not be selected for all the traffic egressing from edge router 120a since PPL load balancing may cause packet out-of-order delivery and re-transmission for mice traffic. The dynamic load balancing schemes discussed in FIG. 3 below address these issues by dynamically selecting PPL balancing algorithm 124d for elephant flow applications 134c to more efficiently utilize the bandwidth of Internet gold circuit 150a and Internet silver circuit 150b.

Although FIG. 2 illustrates a particular number of networks 110, edge routers 120 (edge router 120a and edge router 120b), load balancers 122, load balancing algorithms 124 (source IP only load balancing algorithm 124a, L3 load balancing algorithm 124b, L4 load balancing algorithm 124c, and PPL balancing algorithm 124d), branches 130, hosts 132, applications 134 (FTP applications 134a, SaaS applications 134b, elephant flow applications 134c, and mice flow applications 134d), data centers 140, servers 142, Internet circuits 150 (Internet gold circuit 150a and Internet silver circuit 150b), and FTP connections 160 (FTP control connection 160a and FTP data connection 160b), this disclosure contemplates any suitable number of networks 110, edge routers 120, load balancers 122, load balancing algorithms 124, branches 130, hosts 132, applications 134, data centers 140, servers 142, Internet circuits 150, and FTP connections 160. For example, system 200 may include more or less than three load balancing algorithms 124. As another example, system 200 may include more or less than four types of applications 134. As still another example, system 200 may include more than two internet circuits 150.

Although FIG. 2 illustrates a particular arrangement of network 110, edge routers 120 (edge router 120a and edge router 120b), load balancer 122, load balancing algorithms 124 (source IP only load balancing algorithm 124a, L3 load balancing algorithm 124b, L4 load balancing algorithm 124c, and PPL balancing algorithm 124d), branch 130, host 132, applications 134 (FTP applications 134a, SaaS applications 134b, elephant flow applications 134c, and mice flow applications 134d), data center 140, server 142, Internet circuits 150 (Internet gold circuit 150a and Internet silver circuit 150b), and FTP connections 160 (FTP control connection 160a and FTP data connection 160b), this disclosure contemplates any suitable arrangement of network 110, edge routers 120, load balancer 122, load balancing algorithms 124, branch 130, host 132, applications 134, data center 140, server 142, Internet circuits 150, and FTP connections 160. For example, branch 130 and/or data center 140 may be replaced with a different type of site location.

Furthermore, although FIG. 2 describes and illustrates particular components, devices, or systems carrying out particular actions, this disclosure contemplates any suitable combination of any suitable components, devices, or systems carrying out any suitable actions.

Figure 3:
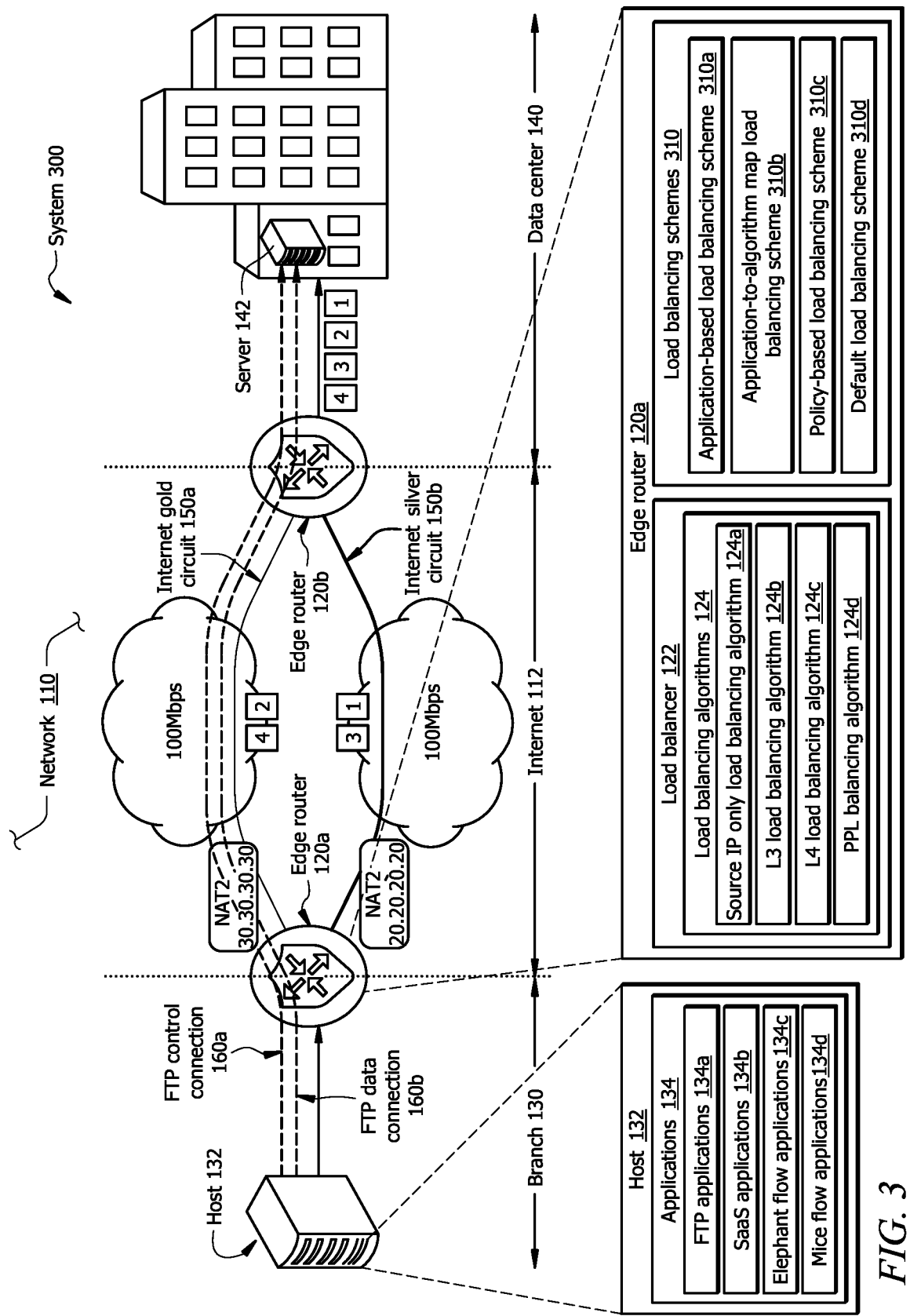
FIG. 3 illustrates a load balancing system for dynamically selecting a load balancing algorithm, in accordance with certain embodiments.

FIG. 3 illustrates an example load balancing system 300 for dynamically selecting load balancing algorithm 124. System 300 or portions thereof may be associated with an entity, which may include any entity, such as a business, company, or enterprise, that dynamically selects load balancing algorithm 124. In certain embodiments, the entity may be a service provider that dynamically selects load balancing algorithm 124. The components of system 300 may include any suitable combination of hardware, firmware, and software. For example, the components of system 300 may use one or more elements of the computer system of FIG. 5.

In the illustrated embodiment of FIG. 3, system 300 includes network 110, edge routers 120 (edge router 120a and edge router 120b), load balancer 122, load balancing algorithms 124 (source IP only load balancing algorithm 124a, L3 load balancing algorithm 124b, L4 load balancing algorithm 124c, and PPL balancing algorithm 124d), branch 130, host 132, applications 134 (FTP applications 134a, SaaS applications 134b, elephant flow applications 134c, and mice flow applications 134d), data center 140, server 142, and Internet circuits 150 (Internet gold circuit 150a and Internet silver circuit 150b), which are described above in FIG. 1.

System 300 also includes load balancing schemes 310. Load balancing schemes 310 are approaches to distributing within network 110. Load balancing schemes 310 include an application-based load balancing scheme 310a, an application-to-algorithm map load balancing scheme 310b, a policy-based load balancing scheme 310c, and a default load balancing scheme 310d.

Application-based load balancing scheme 310a dynamically selects load balancing algorithm 124 (source IP only load balancing algorithm 124a, L3 load balancing algorithm 124b, L4 load balancing algorithm 124c, and PPL balancing algorithm 124d) based on the type of application 134. Since different types of applications 134 are better suited for different load balancing algorithms 124, edge router 120a may use application-based load balancing scheme 310a to select load balancing algorithm 124 that is best suited for the type of application 134. For example, edge router 120a may select source IP only load balancing algorithm 124a for FTP applications 134a and SaaS applications 134b to prevent dropped packets. As another example, edge router 120a may select PPL balancing algorithm 124d for elephant flow applications 134c to efficiently utilize bandwidth. As still another example, edge router 120a may select L3 load balancing algorithm 124b for mice flow applications 134d.

In certain embodiments, edge router 120a may use an application recognition engine such as Network Based Application Recognition (NBAR) to identify the type of application 134. NBAR uses deep packet inspection (DPI) to identify and classify applications 134. Once edge router 120a classifies applications 134, edge router 120a may select the appropriate load balancing algorithm 170 based on the type of application 134 in accordance with application-based load balancing scheme 310a.

Application-to-algorithm map load balancing scheme 310b selects load balancing algorithm 124 (e.g., source IP only load balancing algorithm 124a, L3 load balancing algorithm 124b, L4 load balancing algorithm 124c, and PPL balancing algorithm 124d) based on a user-configured global application-to-algorithm mapping table. For example, a user may map a group of voice/video applications 134 to L3 load balancing algorithm 124b. As another example, a user may map a group of social networking applications 134 to source IP only load balancing algorithm 124a. As still another example, a user may map Hypertext Transfer Protocol (HTTP) applications 134 to L4 load balancing algorithm 170c.

Policy-based load balancing scheme 310c selects load balancing algorithm 124 (e.g., source IP only load balancing algorithm 124a, L3 load balancing algorithm 124b, L4 load balancing algorithm 124c, and PPL balancing algorithm 124d) based on any standard match criteria. The match criteria may include one or more of the following attributes: a type of an application, a source IP address, a destination IP address, a subnet, an IP DSCP, a type of protocol, a site identification, a VPN identification, a sequence number, and the like.

In certain embodiments, edge router 120a may use policy-based load balancing scheme 310c to select load balancing algorithm 124 based on a series of numbered (ordered) sequences of match-action pairs that are evaluated in order. For example, a data policy may be configured to first identify whether application 134 is SaaS application 134b, next identify whether SaaS application 134b is associated with a particular VPN list, and then next identify whether SaaS application 134b is associated with a particular list of SaaS applications 134b (e.g., WebEx audio, WebEx video, etc.). If all of these conditions are met, edge router 120a matches SaaS application 134b to source IP only load balancing algorithm 124a as configured by the policy. Policy-based load balancing scheme 310c is flexible and can be used to define and select different actions (e.g., load sharing) based on different criteria.

Default load balancing scheme 310d is automatically selected if application-based load balancing scheme 310a, application-to-algorithm map load balancing scheme 310b, and policy-based load balancing scheme 310c are not selected. Default load balancing scheme 310d may be based on a global/system level load balancing configuration, a VPN level load balancing configuration, a feature level load balancing configuration, and the like.

In operation, a user selects application-based load balancing scheme 310a for edge router 120a of system 300. Edge router 120a receives FTP traffic via FTP control connection 160a and FTP data connection 160b from host 132 of branch 130. Edge router 120a uses NBAR to associate the FTP traffic with FTP application 134a. Edge router 120a uses application-based load balancing scheme 310a to dynamically select source IP only load balancing algorithm 124a associated with FTP applications 134a, which ensures that the FTP traffic will follow the same route (Internet gold circuit 150a) to server 142 of data center 140. Edge router 120a of system 100 also receives elephant flow traffic from host 132 of branch 130. Edge router 120a uses NBAR to associate the elephant flow traffic with elephant flow application 134c. Edge router 120a uses application-based load balancing scheme 310a to select PPL balancing algorithm 124d, which efficiently distributes elephant flow packets 1, 2, 3, and 4 among internet circuits 150. For example, as illustrated in FIG. 3, edge router 120a may distribute elephant flow packets 1, 2, 3, and 4 in a round robin fashion such that elephant flow packets 1 and 3 follow Internet silver circuit 150b, and elephant flow packets 2 and 4 follow Internet gold circuit 150a. As such, system 300 may be configured to dynamically select a load balancing scheme in accordance with certain criteria such as a type of application, which improves bandwidth and overall efficiency of system 300.

Although FIG. 3 illustrates a particular number of networks 110, edge routers 120 (edge router 120a and edge router 120b), load balancers 122, load balancing algorithms 124 (source IP only load balancing algorithm 124a, L3 load balancing algorithm 124b, L4 load balancing algorithm 124c, and PPL balancing algorithm 124d), branches 130, hosts 132, applications 134 (FTP applications 134a, SaaS applications 134b, elephant flow applications 134c, and mice flow applications 134d), data centers 140, servers 142, Internet circuits 150 (Internet gold circuit 150a and Internet silver circuit 150b), FTP connections 160 (FTP control connection 160a and FTP data connection 160b), and load balancing schemes 310 (application-based load balancing scheme 310a, application-to-algorithm map load balancing scheme 310b, policy-based load balancing scheme 310c, and default load balancing scheme 310d), this disclosure contemplates any suitable number of networks 110, edge routers 120, load balancers 122, load balancing algorithms 124, branches 130, hosts 132, applications 134, data centers 140, servers 142, Internet circuits 150, FTP connections 160, and load balancing schemes 310. For example, system 300 may include more or less than four load balancing schemes 310. As another example, system 300 may include more or less than four types of applications 134. As still another example, system 300 may include more than two Internet circuits 150.

Although FIG. 3 illustrates a particular arrangement of network 110, edge routers 120 (edge router 120a and edge router 120b), load balancer 122, load balancing algorithms 124 (source IP only load balancing algorithm 124a, L3 load balancing algorithm 124b, L4 load balancing algorithm 124c, and PPL balancing algorithm 124d), branch 130, host 132, applications 134 (FTP applications 134a, SaaS applications 134b, elephant flow applications 134c, and mice flow applications 134d), data center 140, server 142, Internet circuits 150 (Internet gold circuit 150a and Internet silver circuit 150b), FTP connections 160 (FTP control connection 160a and FTP data connection 160b), and load balancing schemes 310 (application-based load balancing scheme 310a, application-to-algorithm map load balancing scheme 310b, policy-based load balancing scheme 310c, and default load balancing scheme 310d), this disclosure contemplates any suitable arrangement of network 110, edge routers 120, load balancer 122, load balancing algorithms 124, branch 130, host 132, applications 134, data center 140, server 142, internet circuits 150, FTP connections 160, and load balancing schemes 310. For example, branch 130 and/or data center 140 may be replaced with a different type of site location.

Furthermore, although FIG. 3 describes and illustrates particular components, devices, or systems carrying out particular actions, this disclosure contemplates any suitable combination of any suitable components, devices, or systems carrying out any suitable actions.

Figure 4:
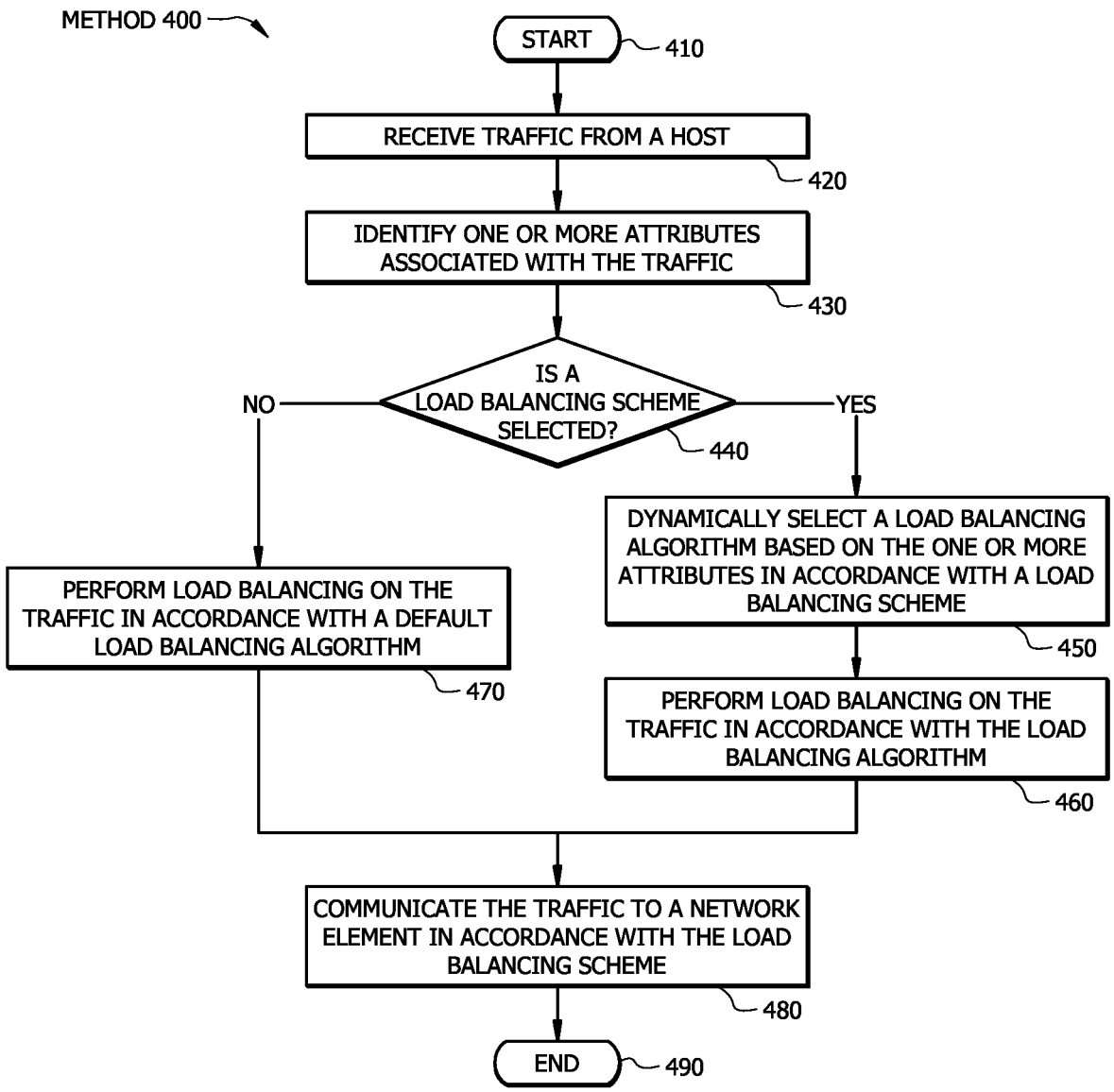
FIG. 4 illustrates a method for dynamically selecting a load balancing algorithm, in accordance with certain embodiments.

FIG. 4 illustrates a method 400 for dynamically selecting a load balancing algorithm, in accordance with certain embodiments. Method 400 uses application-based load balancing schemes to dynamically select a load balancing algorithm (e.g., a source IP only load balancing algorithm, an L3 load balancing algorithm, an L4 load balancing algorithm, a PPL balancing algorithm, and the like) based on one or more criteria such a type of application, which increases the efficiency of the network since different types of applications are better suited for different load balancing algorithms. Method 400 of FIG. 4 may be used by system 300 of FIG. 3.

Method 400 starts at step 410. At step 420 of method 400, an edge router of a network receives traffic from a host of a branch. For example, referring to system 300 of FIG. 3, edge router 120*a* of network 110 may receive traffic such as FTP traffic or elephant flow traffic from host 132 of branch 130. In certain embodiments, the network is an SD-WAN network. Method 400 then moves from step 420 to step 430.

At step 430 of method 400, the edge router identifies one or more attributes associated with the traffic. For example, referring to system 300 of FIG. 3, edge router 120*a* of network 110 may identify a type of application 134 (e.g., FTP application 134*a*, SaaS application 134*b*, elephant flow application 134*c*, or mice flow application 134*d*) associated with the traffic. In certain embodiments, the edge router uses an application recognition engine such as NBAR to identify the type of application 134. As another example, edge router 120*a* of network 110 may identify attributes such as a source IP address, a destination IP address, a subnet, an IP DSCP, a type of protocol, and the like associated with the traffic. Method 400 then moves from step 430 to step 440.

At step 440 of method 400, the edge router determines whether a particular load balancing scheme has been selected. For example, referring to system 300 of FIG. 3, edge router 120*a* of network 110 may determine whether application-based load balancing scheme 310*a*, application-to-algorithm map load balancing scheme 310*b*, or policy-based load balancing scheme 310*c* has been selected. If the edge router determines that a particular load balancing scheme has been selected, method 400 moves from step 440 to step 450, where the edge router dynamically selects a load balancing algorithm based on the one or more attributes in accordance with the load balancing scheme. For example, referring to system 300 of FIG. 3, edge router 120*a* of network 110 may determine that application-based load balancing scheme 310*a* has been selected. In accordance with application-based load balancing scheme 310*a*, edge router 120*a* may dynamically select source IP only load balancing algorithm 124*a*, L3 load balancing algorithm 124*b*, L4 load balancing algorithm 124*c*, or PPL balancing algorithm 124*d* based on the identified type of application 134.

If, at step 440 of method 400, the edge router determines that a particular load balancing scheme has not been selected, method 400 advances from step 440 to step 470, where the edge router performs load balancing on the traffic in accordance with a default load balancing scheme. For example, referring to system 300 of FIG. 3, edge router 120*a* of network 110 may determine that application-based load balancing scheme 310*a*, application-to-algorithm map load balancing scheme 310*b*, and policy-based load balancing scheme 310*c* have not been selected. Edge router 120*a* may use default load balancing scheme 310*d*, which may be configured to use source IP only load balancing algorithm 124*a*, L3 load balancing algorithm 124*b*, L4 load balancing algorithm 124*c*, or PPL balancing algorithm 124*d* for all traffic types.

Method 400 then moves from steps 460 and step 470 to step 480, where the edge router communicates the traffic to a second network element in accordance with the load balancing scheme. For example, referring to system 300 of FIG. 3, edge router 120*a* of network 110 may communicate the traffic to edge router 120*b* in accordance with source IP only load balancing algorithm 124*a*, L3 load balancing algorithm 124*b*, L4 load balancing algorithm 124*c*, or PPL balancing algorithm 124*d*. Method 400 then moves from step 480 to step 490, where method 400 ends. As such, method 400 may be configured to dynamically select a load balancing scheme in accordance with certain criteria such as a type of application, which improves the bandwidth and overall efficiency of the network.

Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates an example method for dynamically selecting a load balancing algorithm including the particular steps of method 400 of FIG. 4, this disclosure contemplates any suitable method for dynamically selecting a load balancing algorithm including any suitable steps, which may include all, some, or none of the steps of method 400 of FIG. 4, where appropriate. Although FIG. 4 describes and illustrates particular components, devices, or systems carrying out particular actions, this disclosure contemplates any suitable combination of any suitable components, devices, or systems carrying out any suitable actions.

Figure 5:
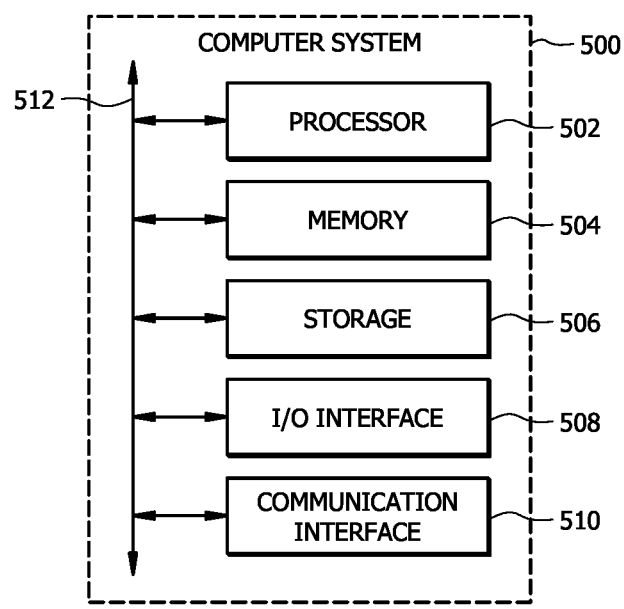
FIG. 5 illustrates a computer system that may be used by the systems and methods described herein, in accordance with certain embodiments.

FIG. 5 illustrates an example computer system 500. In particular embodiments, one or more computer system 500 perform one or more steps of one or more methods described or illustrated herein. In particular embodiments, one or more computer system 500 provide functionality described or illustrated herein. In particular embodiments, software running on one or more computer system 500 performs one or more steps of one or more methods described or illustrated herein or provides functionality described or illustrated herein. Particular embodiments include one or more portions of one or more computer system 500. Herein, reference to a computer system may encompass a computing device, and vice versa, where appropriate. Moreover, reference to a computer system may encompass one or more computer systems, where appropriate.

This disclosure contemplates any suitable number of computer system 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer system 500; be unitary or distributed; span multiple locations; span multiple machines; span multiple data centers; or reside in a cloud, which may include one or more cloud components in one or more networks. Where appropriate, one or more computer system 500 may perform without substantial spatial or temporal limitation one or more steps of one or more methods described or illustrated herein. As an example and not by way of limitation, one or more computer system 500 may perform in real time or in batch mode one or more steps of one or more methods described or illustrated herein. One or more computer system 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 404, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 508 may include one or more device or software drivers enabling processor 502 to drive one or more of these I/O devices. I/O interface 508 may include one or more I/O interfaces 408, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer system 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first network element comprising one or more processors and one or more computer-readable non-transitory storage media coupled to the one or more processors and including instructions that, when executed by the one or more processors, cause the first network element to perform operations comprising:
   receiving an identity of a load balancing scheme;
   selecting, in response to receiving the identity of the load balancing scheme, the load balancing scheme from a plurality of load balancing schemes, wherein each of the plurality of load balancing schemes represents a unique approach to distributing traffic within a network to define and select different actions based on different criteria;
   after selecting the load balancing scheme, receiving traffic;
   identifying, based on the selected load balancing scheme, one or more attributes associated with the traffic;
   dynamically selecting, in accordance with the load balancing scheme, a load balancing algorithm from a plurality of load balancing algorithms based on the one or more attributes;
   performing load balancing on the traffic in accordance with the load balancing algorithm; and
   communicating the traffic to a second network element in accordance with the load balancing;
   wherein selecting the load balancing scheme from the plurality of load balancing schemes comprises selecting the load balancing scheme from at least two of the following load balancing schemes:
      an application-based load balancing scheme;
      an application-to-algorithm map load balancing scheme,
      a policy-based load balancing scheme, and
      a default load balancing scheme.

2. The first network element of claim 1, the operations further comprising dynamically selecting the load balancing algorithm from at least the following load balancing algorithms:
- a source IP address only load balancing algorithm;
- an L3 load balancing algorithm;
- an L4 load balancing algorithm; and
- a per-packet load balancing algorithm.

3. The first network element of claim 1, wherein:
- the one or more attributes associated with the traffic comprise a type of an application; and
- the type of the application is at least one of the following:
  - a File Transfer Protocol (FTP) application;
  - a software as a service (SaaS) application;
  - an elephant flow application; or
  - a mouse flow application.

4. The first network element of claim 1, wherein:
- the one or more attributes associated with the traffic comprise a type of an application; and
- the selected load balancing scheme is the application-based load balancing scheme that matches the type of the application to the load balancing algorithm.

5. The first network element of claim 1, wherein the selected load balancing scheme is the application-to-algorithm map load balancing scheme that matches a type of an application to a user-defined load balancing algorithm.

6. The first network element of claim 1, wherein the selected load balancing scheme is the policy-based load balancing scheme that uses the one or more attributes and a policy to select the load balancing algorithm.

7. The first network element of claim 1, wherein the one or more attributes include at least one of the following set of attributes:
- a type of an application;
- a source Internet Protocol (IP) address;
- a destination IP address;
- a subnet;
- an IP Differentiated Services Code Point (DSCP); or
- a type of protocol.

8. A method, comprising:
- receiving an identity of a load balancing scheme;
- selecting, in response to receiving the identity of the load balancing scheme, the load balancing scheme from a plurality of load balancing schemes, wherein each of the plurality of load balancing schemes represents a unique approach to distributing traffic within a network to define and select different actions based on different criteria;
- after selecting the load balancing scheme, receiving traffic;
- identifying, based on the selected load balancing scheme, one or more attributes associated with the traffic;
- dynamically selecting, in accordance with the load balancing scheme, a load balancing algorithm from a plurality of load balancing algorithms based on the one or more attributes;
- performing load balancing on the traffic in accordance with the load balancing algorithm; and
- communicating the traffic to a network element in accordance with the load balancing;
- wherein selecting the load balancing scheme from the plurality of load balancing schemes comprises selecting the load balancing scheme from at least two of the following load balancing schemes:
  - an application-based load balancing scheme;
  - an application-to-algorithm map load balancing scheme,
  - a policy-based load balancing scheme, and
  - a default load balancing scheme.

9. The method of claim 8, further comprising dynamically selecting the load balancing algorithm from at least one of the following load balancing algorithms:
- a source IP address only load balancing algorithm;
- an L3 load balancing algorithm;
- an L4 load balancing algorithm; or
- a per-packet load balancing algorithm.

10. The method of claim 8, wherein:
- the one or more attributes associated with the traffic comprise a type of an application; and
- the type of the application is at least one of the following:
  - a File Transfer Protocol (FTP) application;
  - a software as a service (SaaS) application;
  - an elephant flow application; or
  - a mouse flow application.

11. The method of claim 8, wherein:
- the one or more attributes associated with the traffic comprise a type of an application; and
- the selected load balancing scheme is the application-based load balancing scheme that matches the type of the application to the load balancing algorithm.

12. The method of claim 8, wherein the selected load balancing scheme is the application-to-algorithm map load balancing scheme that matches a type of an application to a user-defined load balancing algorithm.

13. The method of claim 8, wherein the selected load balancing scheme is the policy-based load balancing scheme that uses the one or more attributes and a policy to select the load balancing algorithm.

14. The method of claim 8, wherein the one or more attributes include one or more from at least one of the following set of attributes:
- a type of an application;
- a source Internet Protocol (IP) address;
- a destination IP address;
- a subnet;
- an IP Differentiated Services Code Point (DSCP); or
- a type of protocol.

15. One or more computer-readable non-transitory storage media embodying instructions that, when executed by a processor, cause the processor to perform operations comprising:
- receiving an identity of a load balancing scheme;
- selecting, in response to receiving the identity of the load balancing scheme, the load balancing scheme from a plurality of load balancing schemes, wherein each of the plurality of load balancing schemes represents a unique approach to distributing traffic within a network to define and select different actions based on different criteria;
- after selecting the load balancing scheme, receiving traffic;
- identifying, based on the selected load balancing scheme, one or more attributes associated with the traffic;
- dynamically selecting, in accordance with the load balancing scheme, a load balancing algorithm from a plurality of load balancing algorithms based on the one or more attributes;
- performing load balancing on the traffic in accordance with the load balancing algorithm; and
- communicating the traffic to a network element in accordance with the load balancing;
- wherein selecting the load balancing scheme from the plurality of load balancing schemes comprises selecting the load balancing scheme from at least two of the following load balancing schemes:
an application-based load balancing scheme;
an application-to-algorithm map load balancing scheme,
a policy-based load balancing scheme, and
a default load balancing scheme.

16. The one or more computer-readable non-transitory storage media of claim 15, the operations further comprising dynamically selecting the load balancing algorithm from at least one of the following load balancing algorithms:
a source IP address only load balancing algorithm;
an L3 load balancing algorithm;
an L4 load balancing algorithm; or
a per-packet load balancing algorithm.

17. The one or more computer-readable non-transitory storage media of claim 15, wherein:
the one or more attributes associated with the traffic comprise a type of an application; and
the type of the application is at least one of the following:
a File Transfer Protocol (FTP) application;
a software as a service (SaaS) application;
an elephant flow application; or
a mouse flow application.

18. The one or more computer-readable non-transitory storage media of claim 15, wherein:
the one or more attributes associated with the traffic comprise a type of an application; and
the selected load balancing scheme is the application-based load balancing scheme that matches the type of the application to the load balancing algorithm.

19. The one or more computer-readable non-transitory storage media of claim 15, wherein the selected load balancing scheme is the application-to-algorithm map load balancing scheme that matches a type of an application to a user-defined load balancing algorithm.

20. The one or more computer-readable non-transitory storage media of claim 15, wherein the selected load balancing scheme is the policy-based load balancing scheme that uses the one or more attributes and a policy to select the load balancing algorithm.

* * * * *